(12) United States Patent
Yamazaki

(10) Patent No.: US 8,730,619 B2
(45) Date of Patent: May 20, 2014

(54) SUSPENSION SUBSTRATE, SUSPENSION, ELEMENT-MOUNTED SUSPENSION, HARD DISK DRIVE, AND MANUFACTURING METHOD OF SUSPENSION SUBSTRATE

(75) Inventor: Tsuyoshi Yamazaki, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 13/884,092

(22) PCT Filed: Oct. 28, 2011

(86) PCT No.: PCT/JP2011/074955
§ 371 (c)(1),
(2), (4) Date: May 8, 2013

(87) PCT Pub. No.: WO2012/063658
PCT Pub. Date: May 18, 2012

(65) Prior Publication Data
US 2013/0229729 A1    Sep. 5, 2013

(30) Foreign Application Priority Data
Nov. 9, 2010 (JP) .................................. 2010-250971

(51) Int. Cl.
*G11B 5/48* (2006.01)
(52) U.S. Cl.
USPC ....................................................... 360/245.9
(58) Field of Classification Search
CPC ........ G11B 5/48; G11B 5/4853; G11B 5/486; G11B 5/484; G11B 5/4846; G11B 5/4806; G11B 5/4813; G11B 5/4826
USPC ......... 360/245.9, 244.1, 244.2, 244.5, 244.3, 360/244.9, 245.4, 234.5, 245, 245.3, 245.7, 360/234.6, 245.1, 245.6, 264.3; 174/254, 174/260, 261, 262
See application file for complete search history.

(56) References Cited

U.S. PATENT DOCUMENTS 6,157,522 A    12/2000  Murphy et al.
6,201,668 B1    3/2001  Murphy
(Continued)

FOREIGN PATENT DOCUMENTS

JP    09-022570 A    1/1997
JP    10-003632 A    1/1998
(Continued)

OTHER PUBLICATIONS

"Development of Heat-Assisting Mode Recording Head Basic Technique that Makes 5 Times Higher in HDD Capacity than Present Products and Contributes to Decrease in Consumption Power of Data Center", Hitac, the Jun. 2010 issue thereof, Hitachi Ltd., pp. 17-18.

(Continued)

*Primary Examiner* — Allen T Cao
(74) *Attorney, Agent, or Firm* — Ladas & Parry LLP

(57) ABSTRACT

A main object of the present invention is to provide a suspension substrate such that design freedom of a wiring layer is improved while restraining the upsizing in accordance with an increase in a wiring layer. The present invention solves the problem by providing a suspension substrate comprising a metal supporting substrate, a first insulating layer, a first wiring layer, a second insulating layer, and a second wiring layer laminated in this order, characterized in that the first wiring layer has a functional element wiring layer connected to a functional element, and the second wiring layer has a signal transmission wiring layer comprising a pair of wiring layers and connected to a recording and reproducing element.

8 Claims, 10 Drawing Sheets

(56) References Cited

U.S. PATENT DOCUMENTS

| | | |
|---|---|---|
| 6,292,320 B1 | 9/2001 | Mason et al. |
| 7,986,495 B2* | 7/2011 | Kamei et al. .................. 360/246 |
| 8,362,365 B2* | 1/2013 | Ho et al. ....................... 174/261 |
| 2009/0211787 A1* | 8/2009 | Kamei et al. .................. 174/250 |
| 2009/0242259 A1* | 10/2009 | Ho et al. ....................... 174/261 |
| 2010/0142097 A1* | 6/2010 | Kawano ...................... 360/245.8 |
| 2010/0243297 A1* | 9/2010 | Oosawa et al. ............... 174/251 |
| 2011/0011626 A1* | 1/2011 | Yamauchi et al. ............ 174/250 |
| 2011/0259632 A1* | 10/2011 | Oosawa et al. ............. 174/266 |
| 2012/0241200 A1* | 9/2012 | Chiyonaga et al. ........... 174/255 |
| 2013/0201581 A1* | 8/2013 | Nishiyama et al. ........ 360/234.3 |
| 2013/0229729 A1* | 9/2013 | Yamazaki .................. 360/244.2 |
| 2013/0271874 A1* | 10/2013 | Miura et al. ............... 360/234.3 |

FOREIGN PATENT DOCUMENTS

| | | | |
|---|---|---|---|
| JP | 2000-348451 A | 12/2000 | |
| JP | 2001-312868 A | 11/2001 | |
| JP | 2005-011387 A | 1/2005 | |
| JP | 2008-059645 A | 3/2008 | |
| JP | 2008-059695 A | 3/2008 | |
| JP | 2008-130165 A | 6/2008 | |
| JP | 2008-159159 A | 7/2008 | |
| JP | 2009-206379 A | 9/2009 | |
| JP | 2009-301597 A | 12/2009 | |
| JP | 2010-040112 A | 2/2010 | |
| JP | 2010-108537 A | 5/2010 | |
| JP | 2010-108575 A | 5/2010 | |
| JP | 2010-146655 A | 7/2010 | |
| JP | 2010-218626 A | 9/2010 | |
| WO | 00/30080 A1 | 5/2000 | |

OTHER PUBLICATIONS

International Search Report mailed Dec. 13, 2011; PCT/JP2011/074955.

* cited by examiner

SUSPENSION SUBSTRATE, SUSPENSION, ELEMENT-MOUNTED SUSPENSION, HARD DISK DRIVE, AND MANUFACTURING METHOD OF SUSPENSION SUBSTRATE

TECHNICAL FIELD

The present invention relates to a suspension substrate used for a hard disk drive (HDD), for example.

BACKGROUND ART

In recent years, an increase in information processing capacity and a speedup in information processing speed of a personal computer have been demanded by reason of the spread of the Internet; accordingly, a larger capacity and a speedup in information transmission rate have been required also for a hard disk drive (HDD) incorporated into a personal computer.

Thermal assist recording is known as one of the techniques for intending a larger capacity (a higher recording density) of HDD (Patent Literatures 1 to 7 and Non Patent Literature 1). Thermal assist recording is to record while temporarily decreasing coercive force of magnetic particles by heating a recording medium immediately before recording. Thus, information is easily recorded in a recording medium even in the case of using magnetic particles with a large coercive force. Also, DSA (Dual Stage Actuator) system is known as another technique for intending a higher recording density (Patent Literatures 8 to 10). DSA system is to improve positioning accuracy of a recording and reproducing element (such as a magnetic head slider) by mounting an actuator element (such as a piezoelectric effect element) on a suspension substrate. Thus, a track pitch of a recording medium may be decreased and a higher recording density of HDD may be intended.

Incidentally, a suspension substrate, such that a lower conductor is provided through an insulating layer under a signal transmission wiring layer (a recording line and a reproducing line) for the purpose of achieving a lower impedance of a signal transmission wiring layer for reading and writing out of a recording and reproducing element, is disclosed in Patent Literature 11. Also, a suspension substrate having a structure in which a pair of signal transmission wiring layers is laminated through an insulating layer is disclosed in Patent Literature 12.

CITATION LIST

Patent Literatures

Patent Literature 1: Japanese Patent Application Publication (JP-A) No. 2009-301597 A
Patent Literature 2: JP-A No. 2010-40112
Patent Literature 3: JP-A No. 2008-159159
Patent Literature 4: JP-A No. 2008-059695
Patent Literature 5: JP-A No. 2008-130165
Patent Literature 6: JP-A No. 2008-059645
Patent Literature 7: JP-A No. 2010-146655
Patent Literature 8: U.S. Pat. No. 6,157,522
Patent Literature 9: U.S. Pat. No. 6,201,668
Patent Literature 10: U.S. Pat. No. 6,292,320
Patent Literature 11: JP-A No. 2005-011387
Patent Literature 12: JP-A No. 2010-108537

Non Patent Literature

Non Patent Literature 1: "Development of Heat-Assisting Mode Recording Head Basic Technique that Makes 5 Times Higher in HDD Capacity than Present Products and Contributes to Decrease in Consumption Power of Data Center", Hitac, the June (2010) issue thereof, Hitachi Ltd., pp. 17-18

SUMMARY OF INVENTION

Technical Problem

A suspension substrate ordinarily comprises a metal supporting substrate having spring properties, an insulating layer formed on the metal supporting substrate, and a signal transmission wiring layer formed on the insulating layer and for reading and writing out of a recording and reproducing element. Here, for example, in the case of using elements used for thermal assist recording and DSA system, a wiring layer for supplying electric power is further required for the reason that these elements require driving power. Also, in order to offer high functionality to a suspension substrate itself, a wiring layer is occasionally required further. The problem is that an increase in a wiring layer to be required causes wiring density to rise. Consequently, design freedom of a wiring layer deteriorates, and the problem is that a suspension substrate needs to be upsized for securing predetermined linewidth. Also, the fining of linewidth allows design freedom of a wiring layer to be improved; however, the fining of linewidth is limited from the viewpoint of quality assurance, and as a result, the problem is that a suspension substrate needs to be upsized.

The present invention has been made in view of the problems, and the main object thereof is to provide a suspension substrate such that design freedom of a wiring layer is improved while restraining the upsizing in accordance with an increase in a wiring layer.

Solution to Problem

In order to solve the problems, the present invention provides a suspension substrate comprising a metal supporting substrate, a first insulating layer formed on the metal supporting substrate, a first wiring layer formed on the first insulating layer, a second insulating layer formed on the first wiring layer, and a second wiring layer formed on the second insulating layer, characterized in that the first wiring layer has a functional element wiring layer connected to a functional element, and the second wiring layer has a signal transmission wiring layer comprising a pair of wiring layers and connected to a recording and reproducing element.

The present invention allows the suspension substrate such that design freedom of a wiring layer is improved while restraining the upsizing in accordance with an increase in a wiring layer for the reason that the first wiring layer has the functional element wiring layer and the second wiring layer has the signal transmission wiring layer. Thus, the signal transmission wiring layer connected to the recording and reproducing element and the functional element wiring layer connected to the other element are regarded as separate layers, so that the suspension substrate such that design freedom of a wiring layer is improved while restraining the upsizing in accordance with an increase in a wiring layer is allowed.

In the invention, the functional element wiring layer preferably has an overlap part which overlaps with the signal transmission wiring layer in a plan view. The reason therefor is to allow the functional element wiring layer the function of decreasing impedance of the signal transmission wiring layer in addition to the original function of being connected to the functional element.

In the invention, the functional element is preferably a thermal assist element or an actuator element.

In the invention, a terminal portion of the functional element wiring layer is preferably a terminal portion connected to the functional element on a surface on the first insulating layer side.

Also, the present invention provides a suspension comprising the above-mentioned suspension substrate and a load beam provided on a surface on the metal supporting substrate side of the suspension substrate.

According to the present invention, the use of the suspension substrate allows the suspension such that design freedom of a wiring layer is improved while restraining the upsizing in accordance with an increase in a wiring layer.

Also, the present invention provides an element-mounted suspension comprising the above-mentioned suspension, and the recording and reproducing element and the functional element mounted on the suspension.

According to the present invention, the use of the suspension allows the element-mounted suspension such that design freedom of a wiring layer is improved while restraining the upsizing in accordance with an increase in a wiring layer.

Also, the present invention provides a hard disk drive comprising the above-mentioned element-mounted suspension.

According to the present invention, the use of the element-mounted suspension provides hard disk drive with further high functionality.

Also, the present invention provides a manufacturing method of a suspension substrate which comprises a metal supporting substrate, a first insulating layer formed on the metal supporting substrate, a first wiring layer formed on the first insulating layer, a second insulating layer formed on the first wiring layer, and a second wiring layer formed on the second insulating layer, comprising steps of: a first wiring layer forming step of forming the first wiring layer having a functional element wiring layer connected to a functional element, and a second wiring layer forming step of forming the second wiring layer having a signal transmission wiring layer comprising a pair of wiring layers and connected to a recording and reproducing element.

The present invention allows the suspension substrate such that design freedom of a wiring layer is improved while restraining the upsizing in accordance with an increase in a wiring layer by reason of comprising the first wiring layer forming step of forming the first wiring layer having the functional element wiring layer, and the second wiring layer forming step of forming the second wiring layer having the signal transmission wiring layer.

Advantageous Effects of Invention

The suspension substrate of the present invention produces the effect such as to allow design freedom of a wiring layer to be improved while restraining the upsizing in accordance with an increase in a wiring layer.

DESCRIPTION OF EMBODIMENTS

A suspension substrate, a suspension, an element-mounted suspension, a hard disk drive, and a manufacturing method of a suspension substrate of the present invention are hereinafter described in detail.

A. Suspension Substrate

The suspension substrate of the present invention comprises a metal supporting substrate, a first insulating layer formed on the metal supporting substrate, a first wiring layer formed on the first insulating layer, a second insulating layer formed on the first wiring layer, and a second wiring layer formed on the second insulating layer, characterized in that the first wiring layer has a functional element wiring layer connected to a functional element, and the second wiring layer has a signal transmission wiring layer comprising a pair of wiring layers and connected to a recording and reproducing element.

Figure 1:
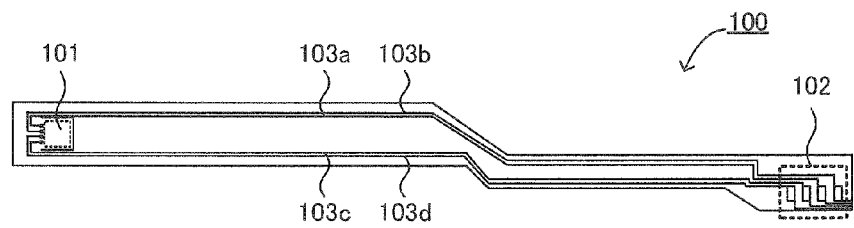
FIG. 1 is a schematic plan view showing an example of a general suspension substrate.

FIG. 1 is a schematic plan view showing an example of a general suspension substrate. Incidentally, in FIG. 1, for convenience, the description of a cover layer is omitted. A suspension substrate 100 shown in FIG. 1 comprises a recording and reproducing element mounting region 101 formed at one tip end, an external circuit board connecting region 102 formed at the other tip end, and plural wiring layers 103a to 103d for electrically connecting the recording and reproducing element mounting region 101 and the external circuit board connecting region 102. The wiring layer 103a and the wiring layer 103b are a pair of wiring layers, and the wiring layer 103c and the wiring layer 103d are also a pair of wiring layers similarly. With regard to these two wiring layers, the one is a wiring layer for writing and the other is a wiring layer for reading.

Figure 2A:
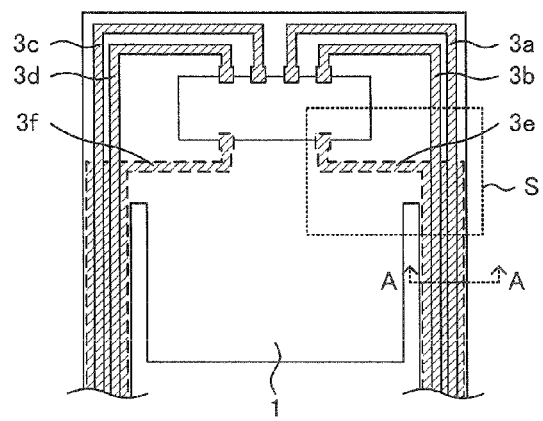
FIGS. 2A and 2B are each a schematic view showing an example of a suspension substrate of the present invention.
Figure 2B:
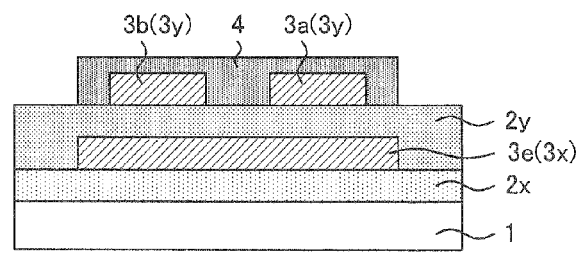

FIGS. 2A and 2B are each a schematic view showing an example of the suspension substrate of the present invention. FIG. 2A is a schematic plan view observing the recording and reproducing element mounting region of the suspension substrate from the second wiring layer side, and FIG. 2B is an A-A cross-sectional view of FIG. 2A. Incidentally, in FIG. 2A, for convenience, the description of a cover layer and the insulating layer is omitted, and the first wiring layer is shown by a broken line.

As shown in FIG. 2B, the suspension substrate of the present invention comprises a metal supporting substrate 1, a first insulating layer 2x formed on the metal supporting substrate 1, a first wiring layer 3x formed on the first insulating layer 2x, a second insulating layer 2y formed on the first wiring layer 3x, a second wiring layer 3y formed on the second insulating layer 2y, and a cover layer 4 for covering the second wiring layer 3y. The present invention is greatly characterized in that the first wiring layer 3x has functional element wiring layers 3e and 3f connected to a functional element (such as a thermal assist element), and the second wiring layer 3y has a signal transmission wiring layer (wiring layers for writing 3a and 3b, and wiring layers for reading 3c and 3d) connected to a recording and reproducing element. In addition, the functional element wiring layers 3e and 3f are preferably formed so as to overlap with the signal transmission wiring layers 3a to 3d in a plan view. The reason therefor is to allow a lower impedance of the signal transmission wiring layers 3a to 3d to be intended.

The present invention allows the suspension substrate such that design freedom of a wiring layer is improved while restraining the upsizing in accordance with an increase in a wiring layer for the reason that the first wiring layer has the functional element wiring layer and the second wiring layer has the signal transmission wiring layer. Thus, the signal transmission wiring layer connected to the recording and reproducing element and the functional element wiring layer connected to the other element are regarded as separate layers, so that the suspension substrate such that design freedom of a wiring layer is improved while restraining the upsizing in accordance with an increase in a wiring layer is allowed. Here, when the suspension substrate is upsized in the width direction, an increase in product placement pitch (a decrease in product quantity to be attached on a surface) causes a defect that costs increase and a defect that a lower rigidity is achieved with difficulty. On the contrary, the suspension substrate of the present invention does not cause such defects for the reason that the signal transmission wiring layer and the functional element wiring layer are laminated through the second insulating layer in the thickness direction.

The suspension substrate of the present invention is hereinafter described while dividing into a member of the suspension substrate and a constitution of the suspension substrate.

1. Member of Suspension Substrate

The member of the suspension substrate of the present invention is first described. The suspension substrate of the present invention comprises a metal supporting substrate, a first insulating layer, a first wiring layer, a second insulating layer, and a second wiring layer.

The metal supporting substrate in the present invention functions as a supporting body of the suspension substrate. A material for the metal supporting substrate is preferably a metal having spring properties, and specific examples thereof include SUS. Also, the thickness of the metal supporting substrate varies with kinds of the material therefor, and is within a range of 10 μm to 20 μm, for example.

The first insulating layer in the present invention is formed on the metal supporting substrate. A material for the first insulating layer is not particularly limited if the material has insulating properties, but examples thereof include a resin. Examples of the resin include a polyimide resin, a polybenzoxazole resin, a polybenzimidazole resin, an acrylic resin, a polyether nitrile resin, a polyether sulfone resin, a polyethylene terephthalate resin, a polyethylene naphthalate resin, and a polyvinyl chloride resin; above all, a polyimide resin is preferable. The reason therefor is to be excellent in insulating properties, heat resistance and chemical resistance. Also, the material for the first insulating layer may be a photosensitive material or a non-photosensitive material. The thickness of the first insulating layer is, for example, preferably within a range of 5 μm to 30 μm, more preferably within a range of 5 μm to 18 μm, and far more preferably within a range of 5 μm to 12 μm.

The first wiring layer in the present invention is formed on the first insulating layer. A material for the first wiring layer is not particularly limited if the material has electrical conductivity, but examples thereof include metal, preferably copper (Cu) above all. Also, the material for the first wiring layer may be rolled copper or electrolyte copper. The thickness of the first wiring layer is, for example, preferably within a range of 5 μm to 18 μm, and more preferably within a range of 9 μm to 12 μm. Also, a wiring plating portion is preferably formed on part of a surface of the first wiring layer. The reason therefor is that the wiring layer may be prevented from deteriorating (such as corroding) by providing the wiring plating portion. Above all, in the present invention, the wiring plating portion is preferably formed in a terminal portion for connecting to an element and an external circuit board. Kinds of the wiring plating portion are not particularly limited, but examples thereof include Au plating, Ni plating and Ag plating. Above all, in the present invention, Ni plating and Au plating are preferably formed from the surface side of the first wiring layer. The thickness of the wiring plating portion is within a range of 0.1 μm to 4 μm, for example.

The second insulating layer in the present invention is formed between the first wiring layer and the second wiring layer. A material for the second insulating layer is the same as the above-mentioned material for the first insulating layer. The thickness of the second insulating layer between the first wiring layer and the second wiring layer (thickness between wiring) is not particularly limited, but is, for example, preferably within a range of 5 μm to 30 μm, more preferably within a range of 5 μm to 18 μm, and far more preferably within a range of 5 μm to 12 μm.

The second wiring layer in the present invention is formed on the second insulating layer. Factors such as a material and thickness of the second wiring layer are the same as the case of the first wiring layer, for example. Also, in the case where a terminal portion of the second wiring layer is folded and processed in mounting an element, or in the case where the second wiring layer has a flying lead portion with both surfaces thereof exposed, the second wiring layer excellent in mechanical strength is preferably used. Specifically, mechanical strength of the second wiring layer is preferably improved by selecting material and thickness of the second wiring layer. For example, not electrolyte copper but rolled copper excellent in mechanical strength is preferably used as the material for the second wiring layer. Also, in the case of using electrolyte copper, thickness thereof is preferably thickened (for example, 12 μm or more). Also, a wiring plating portion is preferably formed on part of a surface of the second wiring layer.

Also, the suspension substrate of the present invention may have a cover layer formed so as to cover the second wiring layer. The second wiring layer may be prevented from deteriorating (such as corroding) by providing the cover layer. Examples of a material for the cover layer include a resin described as the material for the first insulating layer; above all, a polyimide resin is preferable. Also, the material for the cover layer may be a photosensitive material or a non-photosensitive material. The thickness of the cover layer is, for example, preferably within a range of 2 μm to 30 μm, and more preferably within a range of 2 μm to 10 μm.

2. Constitution of Suspension Substrate

Next, the constitution of the suspension substrate of the present invention is described. The suspension substrate of the present invention is greatly characterized in that the first wiring layer has the functional element wiring layer and the second wiring layer has the signal transmission wiring layer.

The functional element wiring layer in the present invention is a wiring layer for connecting to a functional element. The functional element wiring layer is a wiring layer for supplying electric power to the functional element, for example. Also, the functional element in the present invention is an element except a recording and reproducing element and an element for allowing some function to a hard disk drive. Examples of such a functional element include a thermal assist element and an actuator element. On the other hand, the recording and reproducing element in the present invention is not particularly limited if the element may record and reproduce in a recording medium (a disk), but examples thereof include an element having a magnetic generation element and a slider.

Figure 3:
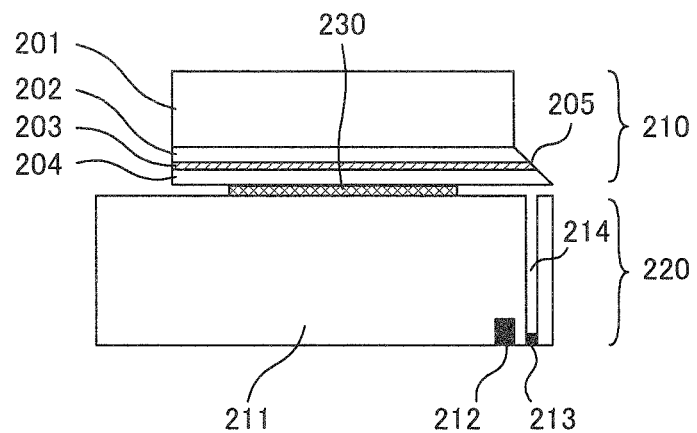
FIG. 3 is a schematic cross-sectional view showing an example of general thermal assist element and recording and reproducing element.

Here, FIG. 3 is a schematic cross-sectional view showing an example of general thermal assist element and recording and reproducing element. A thermal assist element 210 in FIG. 3 has a semiconductor substrate 201, a first clad layer 202, an active layer 203, a second clad layer 204, and a reflecting mirror 205. On the other hand, a recording and reproducing element 220 in FIG. 3 has a slider 211, a magnetic field generation element 212, a near-field photogeneration element 213, and an optical waveguide 214. Also, the thermal assist element 210 and the recording and reproducing element 220 are joined by an adhesive layer 230. Here, output light from the active layer 203 is reflected by the reflecting mirror 205 to pass through the optical waveguide 214 and lead to the near-field photogeneration element 213. Thus, a recording medium may be heated immediately before the magnetic field generation element 212 records, and coercive force of magnetic particles may be temporarily decreased.

The thermal assist element is not particularly limited if the element may assist the recording of the recording and reproducing element by heat. Above all, the thermal assist element in the present invention is preferably an element utilizing light. The reason therefor is that thermal assist recording by photodominant recording system may be performed. Examples of the thermal assist element utilizing light include a semiconductor laser diode element. The semiconductor laser diode element may be a pn-type element, or a pnp-type or npn-type element. The thermal assist element utilizing light may have a reflex lens and a condensing lens as required for guiding output light to the optical waveguide provided in the slider. Also, the semiconductor laser diode element may be a surface-emitting laser or an edge-emitting laser.

Figure 4A:
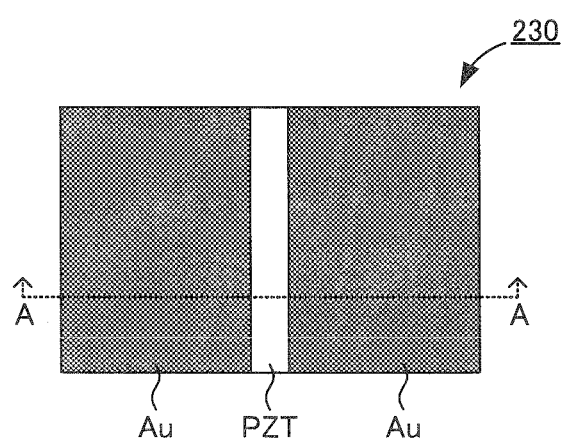
FIGS. 4A and 4B are each a schematic cross-sectional view showing an example of a general actuator element.
Figure 4B:
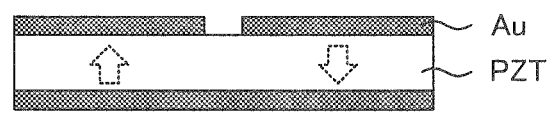

On the other hand, FIGS. 4A and 4B are each a schematic view showing an example of a general actuator element. FIG. 4A is a schematic plan view showing an example of the actuator element, and FIG. 4B is an A-A cross-sectional view of FIG. 4A. An actuator element 230 shown in FIG. 4A is a piezoelectric effect element including PZT, and a pad including Au plating is formed on a surface of PZT. Also, two pads have different polarities and the piezoelectric effect element has two poles in a single element. The utilization of stretching response of the piezoelectric effect element allows positioning at a submicron unit. Also, the piezoelectric effect element has the advantages that energy efficiency is high, withstand load is large, responsibility is fast, no abrasion deterioration is observed, and no magnetic fields are generated. Incidentally, the piezoelectric effect element having two poles is shown in FIGS. 4A and 4B, and the piezoelectric effect element having one pole may be used by two pieces.

The signal transmission wiring layer in the present invention is a wiring layer for connecting to the recording and reproducing element. The signal transmission wiring layer is ordinarily a differential wiring comprising a pair of wiring layers, and performs recording or reproduce in the recording and reproducing element. The second wiring layer in the present invention is greatly characterized by including the signal transmission wiring layer, and the signal transmission wiring layer in the second wiring layer may be only wiring layers for writing, only wiring layers for reading, or both a wiring layer for writing and a wiring layer for reading.

Figure 5A:
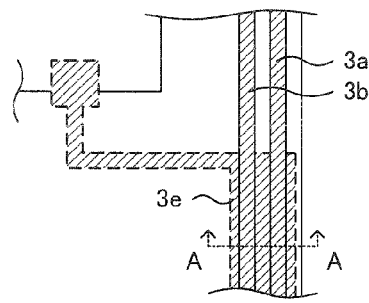
FIGS. 5A to 5F are each a schematic view explaining a positional relation between a first wiring layer and a second wiring layer in the present invention.
Figure 5B:
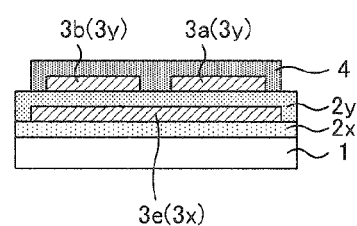
Figure 5C:
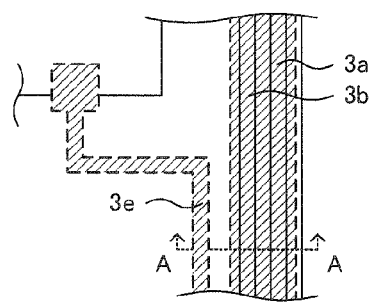
Figure 5D:
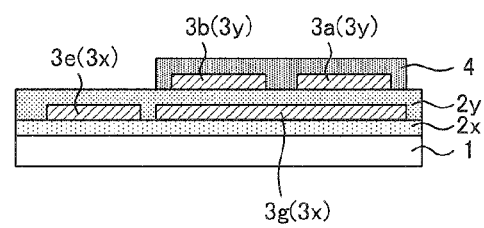
Figure 5E:
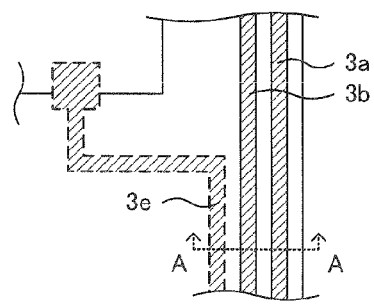
Figure 5F:
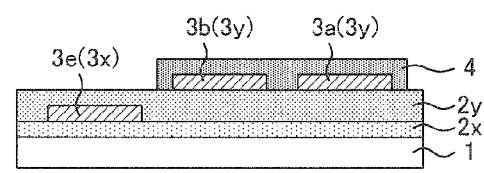

Next, a positional relation between the first wiring layer and the second wiring layer in the present invention is described. Here, FIGS. 5A, 5C and 5E are schematic plan views showing a positional relation between the functional element wiring layer and the signal transmission wiring layer in the present invention, and FIGS. 5B, 5D and 5F are A-A cross-sectional views of FIGS. 5A, 5C and 5E, respectively. Incidentally, in FIGS. 5A, 5C and 5E, for convenience, the description of the cover layer and the insulating layer is omitted, and the functional element wiring layer is shown by a broken line. Also, FIGS. 5A, 5C and 5E are schematic plan views corresponding to a region S of FIG. 2A.

In the present invention, as shown in FIGS. 5A and 5B, the functional element wiring layer 3e preferably has an overlap part which overlaps with the signal transmission wiring layers 3a and 3b in a plan view. The reason therefor is to allow the functional element wiring layer the function of decreasing impedance of the signal transmission wiring layer in addition to the original function of being connected to the functional element. Furthermore, from the viewpoint of designing impedance, the width of the overlap part preferably includes the whole width of a pair of the wiring layers in a plan view.

In FIG. 5B, the width of the second wiring layer 3y is, for example, preferably within a range of 10 μm to 200 μm, and more preferably within a range of 10 μm to 100 μm. On the other hand, the width of the overlap part of the functional element wiring layer 3e is, for example, preferably within a range of 40 μm to 1000 μm, and more preferably within a range of 40 μm to 250 μm. Also, the length of the overlap part of the functional element wiring layer 3e is, for example, preferably 50% or more, more preferably 80% or more, and far more preferably 90% or more with respect to the total length of the signal transmission wiring layers 3a and 3b. In particular, in the design of impedance, impedance is preferably adjusted in a region in which the signal transmission wiring layers are linearly formed at the same thickness. The reason therefor is to easily design impedance.

Also, in the present invention, as shown in FIGS. 5C and 5D, a conductor section 3g of the first wiring layer 3x may overlap with the signal transmission wiring layers 3a and 3b in a plan view. This structure is such that the conductor section 3g for adjusting impedance is provided instead of the overlap part of the functional element wiring layer 3e. Incidentally, in the present invention, as shown in FIGS. 5E and 5F, the functional element wiring layer 3e may not overlap with the signal transmission wiring layers 3a and 3b.

Figure 6A:
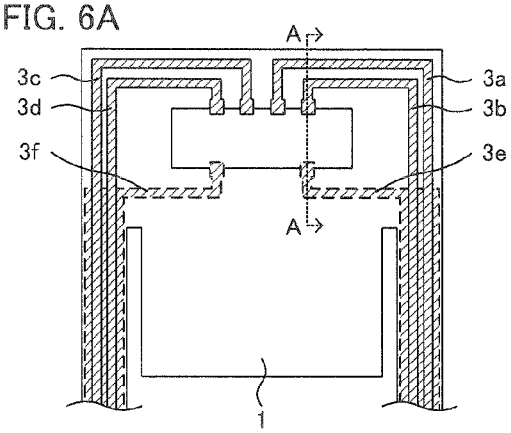
FIGS. 6A to 6E are each a schematic view showing an example of a suspension substrate of the present invention.
Figure 6B:
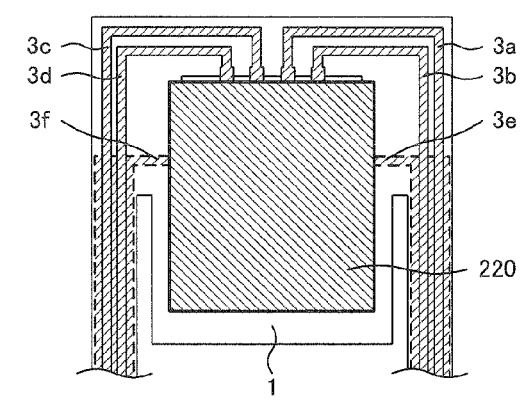
Figure 6C:
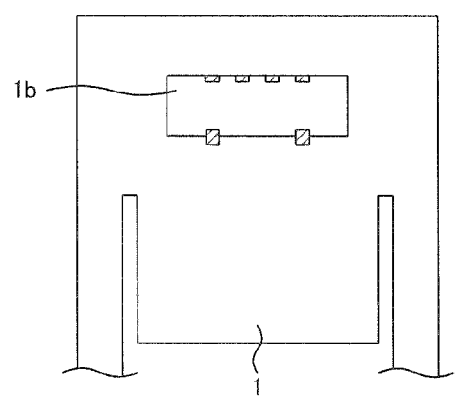
Figure 6D:
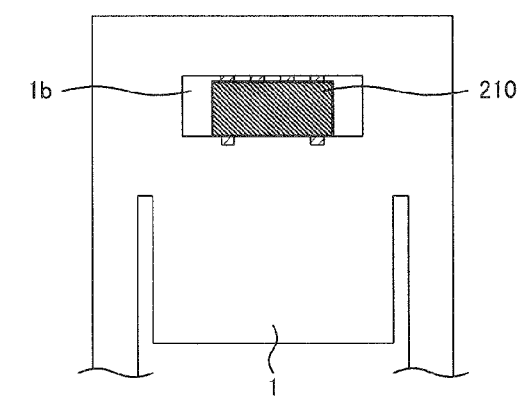

Next, the case where the functional element is the thermal assist element is described in further detail. FIGS. 6A to 6E are each a schematic view showing an example of the suspension substrate of the present invention. FIG. 6A is a schematic plan view observing the recording and reproducing element mounting region of the suspension substrate from the second wiring layer side, and FIG. 6B is a schematic plan view showing a state such that the recording and reproducing element 220 is mounted in FIG. 6A. On the other hand, FIG. 6C is a schematic plan view observing FIG. 6A from the backside, and FIG. 6D is a schematic plan view showing a state such that the thermal assist element 210 is mounted in FIG.

Figure 6E:
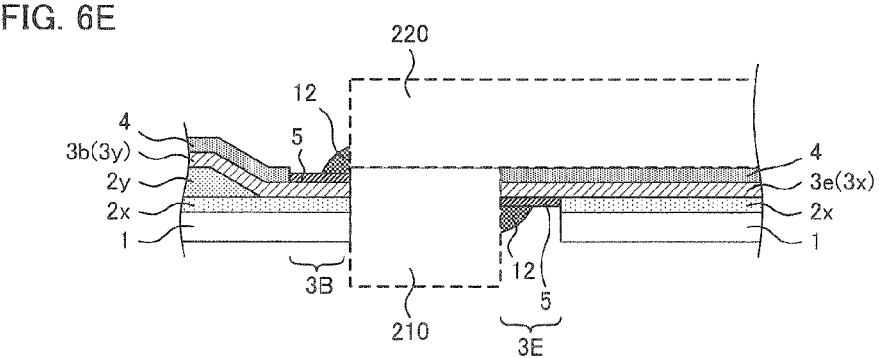

6C. Also, FIG. 6E is an A-A cross-sectional view of FIG. 6A. Incidentally, in FIGS. 6A and 6B, for convenience, the description of the cover layer and the insulating layer is omitted, and the first wiring layer is shown by a broken line. Also, in FIGS. 6A to 6D, for convenience, the description of the wiring plating portion is omitted.

As shown in FIGS. 6A to 6E, the suspension substrate of the present invention has the wiring layers for writing 3a and 3b, the wiring layers for reading 3c and 3d, and the thermal assist wiring layers 3e and 3f for supplying electric power to the thermal assist element 210. A terminal portion of these wiring layers is disposed in the vicinity of an aperture of the metal supporting substrate 1 so as to connect to the thermal assist element 210 and the recording and reproducing element 220. In particular, as shown in FIG. 6A, the functional element wiring layers 3e and 3f are formed so as to overlap with the signal transmission wiring layers 3a to 3d in a plan view immediately before leading to the aperture of the metal supporting substrate 1.

Also, as shown in FIG. 6E, a terminal portion 3E of the thermal assist wiring layer 3e has a wiring plating portion (such as an Au plating portion) 5 on a surface on the first insulating layer 2x side, and is connected to the thermal assist element 210 through a conductive connecting portion (such as solder) 12. On the other hand, a terminal portion 3B of the wiring layer for writing 3b has the wiring plating portion 5 on a surface on the cover layer 4 side (the opposite side to the second insulating layer 2y), and is connected to the recording and reproducing element 220 through the conductive connecting portion 12.

Next, a connecting method of the terminal portion of the thermal assist wiring layer and the thermal assist element is described. The terminal portion of the thermal assist wiring layer may connect to the thermal assist element on a surface on the first insulating layer side, or connect to the thermal assist element on a surface on the opposite side to the first insulating layer. Incidentally, the former is occasionally referred to as backside access.

Figure 7A:
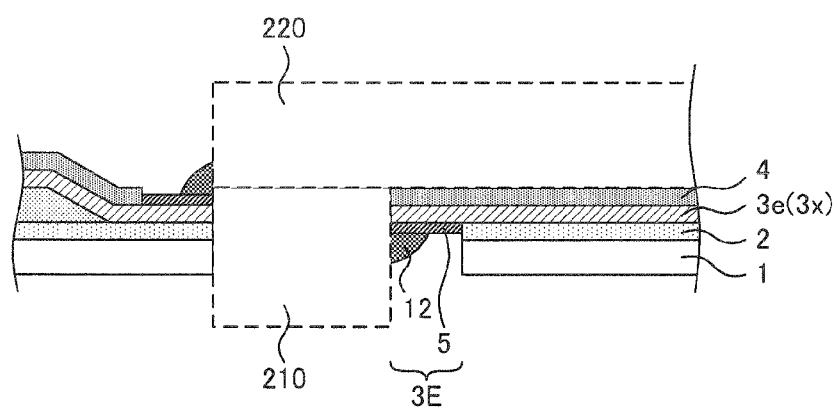
FIGS. 7A and 7B are each a schematic cross-sectional view explaining a terminal portion of a thermal assist wiring layer in the present invention.

Examples of the terminal portion connecting to the thermal assist element on a surface on the first insulating layer side include the terminal portion 3E connecting to the thermal assist element on a surface on the first insulating layer 2x side, as shown in FIG. 7A. The cover layer 4 (or the second insulating layer) is preferably formed on this terminal portion 3E.

Such a terminal portion has the following advantage. That is to say, the downward force by negative pressure from the slider bottom face while utilizing the current of air may be directly conveyed to a flexible flexure (the suspension substrate) by connecting the thermal assist element on a surface on the first insulating layer side of the terminal portion, so that the advantage that the floating position of the recording and reproducing element is easily controlled is brought. Here, in the case where the thermal assist element in addition to the recording and reproducing element is mounted on the suspension substrate, the weight increases by the thermal assist element as compared with the case of mounting only the recording and reproducing element. Thus, it is conceived that the load of a voice coil motor and a dual stage actuator (micro- or milli-actuator) for positioning a recording coil becomes so large as to hinder high-speed positioning. Also, the case where disturbance in positioning increases and becomes violent, such as the case where impact is applied to HDD, easily causes the problem (crash) that a slight floating quantity may not be maintained and the recording and reproducing element contacts with the disk. Thus, it becomes important to further control the floating position of the suspension.

Figure 7B:
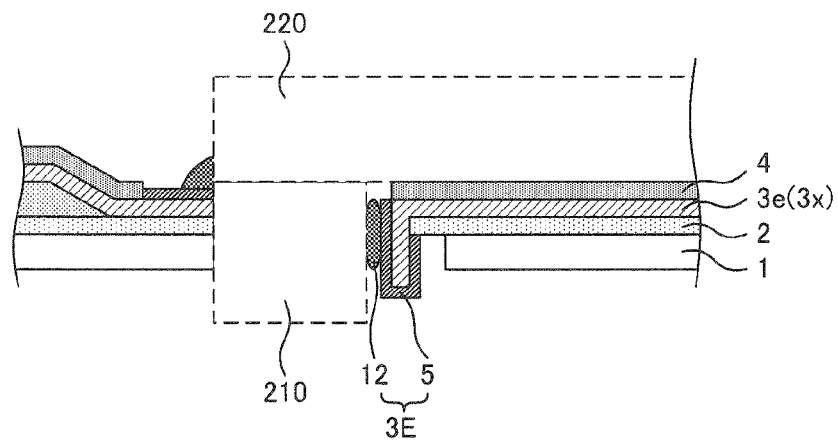

On the other hand, examples of the terminal portion connecting to the thermal assist element on a surface on the opposite side to the first insulating layer include the terminal portion 3E whose both faces on the first insulating layer side and the opposite side thereto are exposed, as shown in FIG. 7B. This terminal portion 3E is preferably connected to the thermal assist element while folded and processed.

Such a terminal portion has the following advantage. That is to say, an area in which the thermal assist element may be disposed with respect to the recording and reproducing element may be secured so largely that the advantage that a positional relation between the recording and reproducing element and the thermal assist element is easily controlled is brought. Here, if the position of the thermal assist element disposed on the recording and reproducing element is not exactly adapted to a waveguide formed beside a magnetic pole (a waveguide in the slider), optical coupling efficiency of a waveguide between a light source and the slider to a waveguide in the slider, or optical coupling efficiency of a light source to a waveguide in the slider decreases, so that the problem is caused such that light intensity introduced into a waveguide in the slider decreases and rising temperature of the disk decreases. Thus, it becomes important to control a positional relation between the recording and reproducing element and the thermal assist element. Also, an area in which the thermal assist element may be disposed with respect to the recording and reproducing element may be secured so largely that the thermal assist element may be easily disposed even though the size thereof increases in accordance with the achievement of higher output. Also, an area in which the thermal assist element may be disposed becomes so large by folding the wiring layer as compared with the case of not folding that the advantage that the size of the aperture may not be changed even though the size of the thermal assist element increases is brought. In the case of not folding the wiring layer, a connection structure thereof needs to be produced on the bottom face of the thermal assist element, so that an area in which the thermal assist element may be disposed becomes small. Also, the folding of the wiring layer brings the advantage that the thermal assist element having the connection structure on a side face may be connected without providing a lead wire in the element.

Next, the disposition of the thermal assist wiring layer and the recording and reproducing element in the present invention is described. As shown in FIGS. 6C and 6D, the metal supporting substrate 1 in the present invention preferably has an aperture 1b for disposing the thermal assist element 210 so as to inlay. The reason therefor is that the terminal portion of the thermal assist wiring layer easily performs backside access. The aperture may be an aperture (such as the aperture 1b shown in FIG. 6C) completely separated from the outer periphery of the metal supporting substrate, or an aperture having a notch such that part of the aperture connects to the outer peripheral surface of the metal supporting substrate, if the aperture is to dispose the thermal assist element so as to inlay.

Also, as shown in FIG. 6E, the suspension substrate of the present invention is preferably mounted with the recording and reproducing element 220 on a surface thereof. In addition, the thermal assist element 210 is preferably mounted on the recording and reproducing element 220, exposed from the aperture 1b, by disposing the thermal assist element 210 so as to inlay into the aperture 1b. Incidentally, an adhesive layer may be each formed between the suspension substrate and the recording and reproducing element 220, and between the thermal assist element 210 and the recording and reproducing element 220.

Figure 8A:
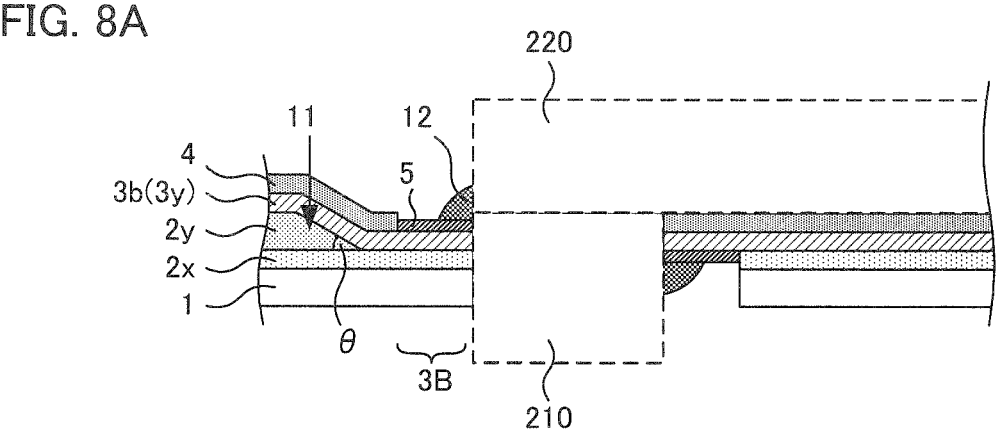
FIGS. 8A to 8C are each a schematic cross-sectional view explaining a terminal portion of a signal transmission wiring layer in the present invention.
Figure 8B:
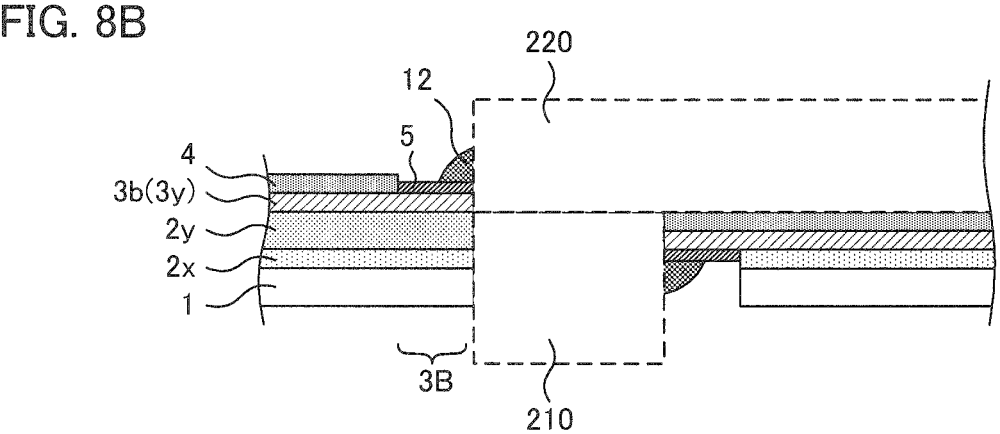
Figure 8C:
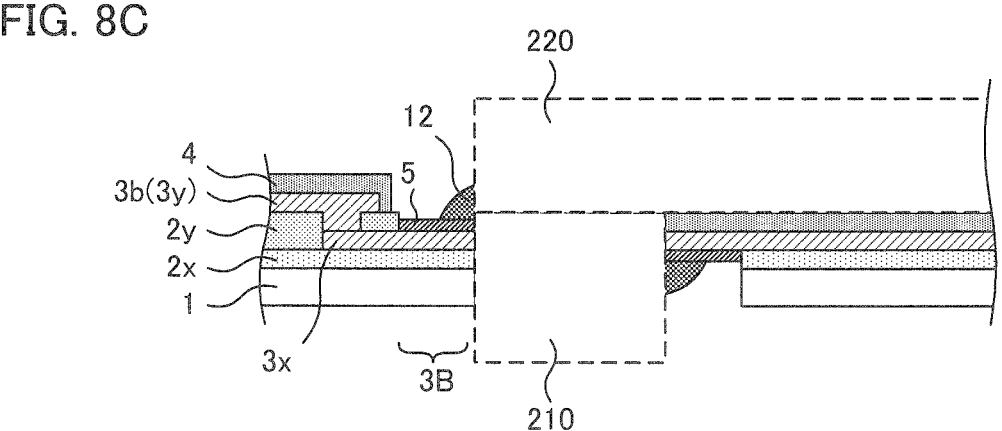

Next, the connection of the signal transmission wiring layer and the recording and reproducing element is described. The signal transmission wiring layer in the present invention is formed on the second insulating layer. As shown in FIG. 8A, the terminal portion 3B of the wiring layer for writing 3b may be formed on the first insulating layer 2x through a bend section 11 of the second insulating layer 2y before being connected to the recording and reproducing element 220. The formation of the terminal portion 3B on the first insulating layer 2x allows the terminal portion 3B and the recording and reproducing element 220 to be connected in the same way as a conventional suspension substrate. The shape of the bend section 11 may be a shape such that the thickness of the second insulating layer 2y decreases gradually (0<θ<90°, or a shape such that the thickness of the second insulating layer 2y decreases rapidly (θ=90°), as shown in FIG. 8A. On the other hand, as shown in FIG. 8B, the terminal portion 3B of the wiring layer for writing 3b may be formed on the second insulating layer 2y. The formation of the terminal portion 3B on the second insulating layer 2y allows the wiring layer for writing 3b (the second wiring layer 3y) to be connected to the recording and reproducing element 220 without being bent, so that the advantage that damage such as breaking of wire is caused with difficulty is brought. Also, as shown in FIG. 8C, the wiring layer for writing 3b (the second wiring layer 3y) may be formed so as to pierce through the second insulating layer 2y and connect to the first wiring layer 3x. Incidentally, in FIG. 8C, a veer piercing through the second insulating layer 2y is represented as part of the second wiring layer 3y, and the second wiring layer 3y and the first wiring layer 3x may be electrically connected by an optional veer (such as veer plating). Also, in FIGS. 8A to 8C, the connection of the signal transmission wiring layer and the recording and reproducing element is described while using the case where the thermal assist element 210 is present, and the connection is the same in the case where the thermal assist element 210 is not present.

Figure 9A:
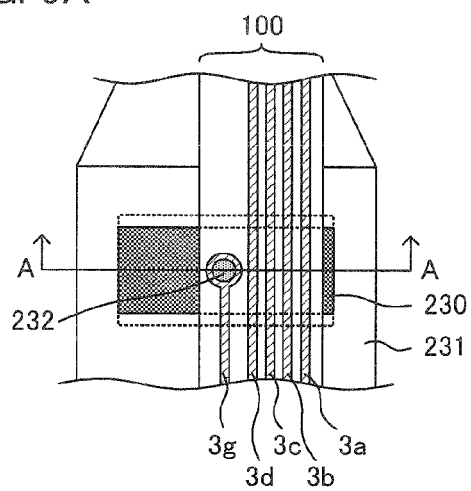
FIGS. 9A and 9B are each a schematic plan view explaining an actuator element in the present invention.
Figure 9B:
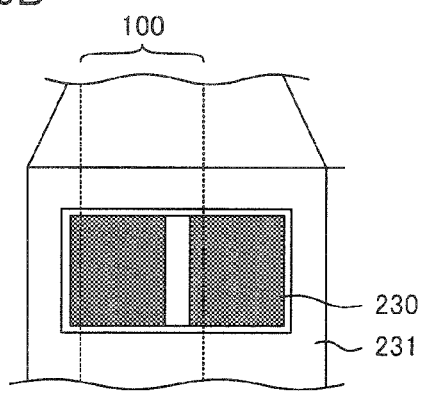

Next, the case where the functional element is the actuator element is described in further detail. FIGS. 9A and 9B are each a schematic plan view explaining the actuator element in the present invention. FIG. 9A is a schematic plan view observing the actuator element from the suspension substrate 100 side, and FIG. 9B is a schematic plan view observing FIG. 9A from the backside. Also, FIG. 10 is an A-A cross-sectional view of FIG. 9A.

Figure 10:
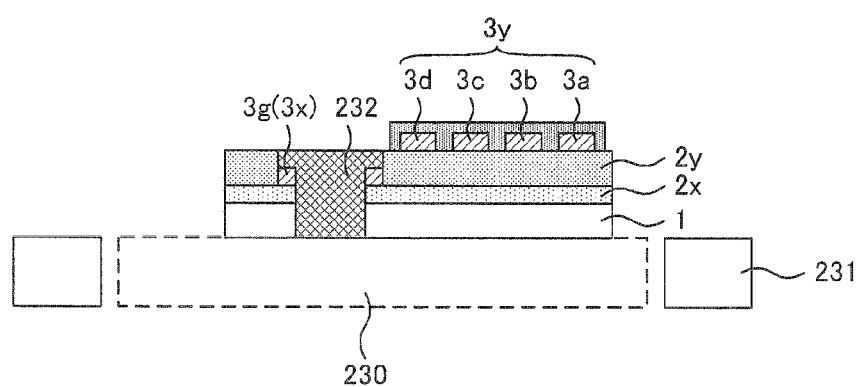
FIG. 10 is a schematic cross-sectional view explaining an actuator element in the present invention.

As shown in FIGS. 9 and 10, the suspension substrate 100 of the present invention has the actuator element wiring layer 3g as the first wiring layer 3x and the signal transmission wiring layer (wiring layers for writing 3a and 3b, and wiring layers for reading 3c and 3d) as the second wiring layer 3y. The actuator element 230 is disposed on a surface on the metal supporting substrate 1 side of the suspension substrate 100 so as to be inlaid into a metal supporting substrate 231 composing the suspension. Also, a metal supporting plate for disposing the actuator element so as to inlay may be separately prepared. In addition, the actuator element wiring layer 3g and the actuator element 230 are electrically connected by a connecting portion 232. Examples of the connecting portion 232 include solder and a conductive adhesive agent. Also, the connecting portion 232 may be formed by ultrasonic bonding with the use of metal.

Incidentally, the suspension substrate of the present invention may be such that the first wiring layer has the signal transmission wiring layer and the second wiring layer has the functional element wiring layer.

B. Suspension

Next, a suspension of the present invention is described. The suspension of the present invention comprises the suspension substrate explained above and a load beam provided on a surface on the metal supporting substrate side of the suspension substrate.

Figure 11A:
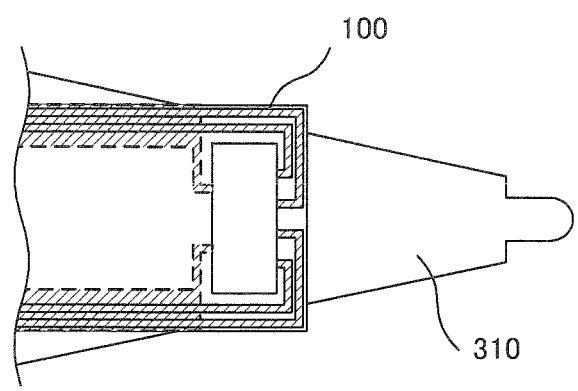
FIGS. 11A to 11C are each a schematic view showing an example of a suspension of the present invention.
Figure 11B:
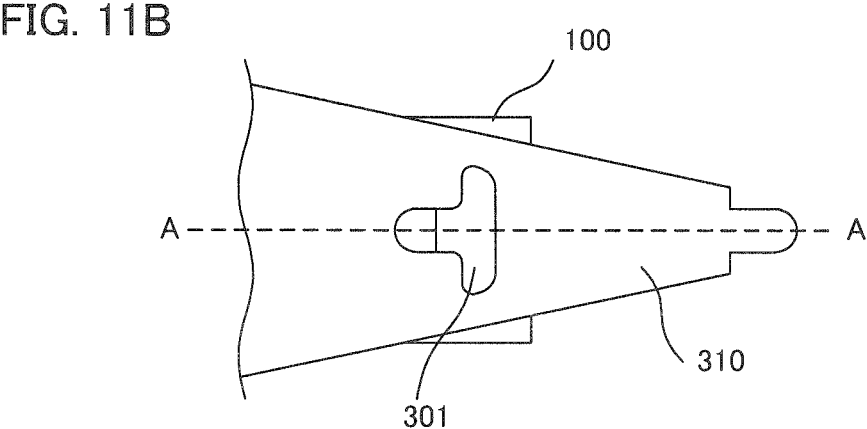
Figure 11C:
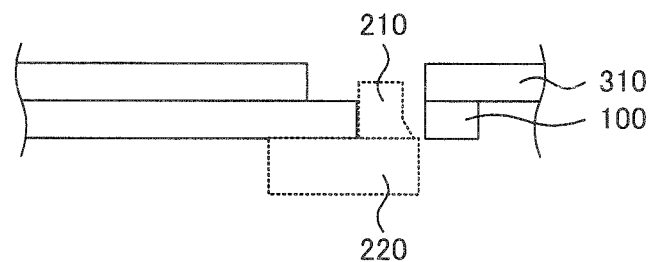

FIGS. 11A to 11C are each a schematic view showing an example of the suspension of the present invention. FIG. 11A is a schematic plan view showing an example of the suspension of the present invention, FIG. 11B is a schematic plan view observing FIG. 11A from the load beam side, and FIG. 11C is an A-A cross-sectional view of FIG. 11B. As shown in FIGS. 11A and 11B, the suspension of the present invention comprises the above-mentioned suspension substrate 100 and a load beam 310 provided on a surface on the metal supporting substrate side of the suspension substrate 100. The load beam 310 has an aperture 301 for disposing the functional element (such as the thermal assist element) so as to inlay. Also, as shown in FIG. 11C, in the present invention, it is preferable that the recording and reproducing element 220 is mounted on a surface of the suspension substrate 100, and the functional element (such as the thermal assist element) 210 is disposed in the aperture of the suspension substrate 100 and the load beam 310 so as to be inlaid into.

According to the present invention, the use of the suspension substrate allows the suspension such that design freedom of a wiring layer is improved while restraining the capsizing in accordance with an increase in a wiring layer.

The suspension substrate in the present invention is the same as the contents described in the "A. Suspension substrate"; therefore, the description herein is omitted. On the other hand, the load beam in the present invention is provided on a surface on the metal supporting substrate side of the suspension substrate. A material for the load beam is not particularly limited but examples thereof include metal, preferably SUS.

C. Element-Mounted Suspension

Next, an element-mounted suspension of the present invention is described. The element-mounted suspension of the present invention comprises the suspension explained above, and the recording and reproducing element and the functional element mounted on the suspension.

According to the present invention, the use of the suspension allows the element-mounted suspension such that design freedom of a wiring layer is improved while restraining the upsizing in accordance with an increase in a wiring layer.

Examples of the element-mounted suspension of the present invention include the element-mounted suspension shown in the FIG. 11C. Also, the element-mounted suspension of the present invention has at least the suspension and the element. The suspension is the same as the contents described in the "B. Suspension"; therefore, the description herein is omitted. Also, the recording and reproducing element and the functional element are the same as the contents described in the "A. suspension substrate"; therefore, the description herein is omitted.

D. Hard Disk Drive

Next, a hard disk drive of the present invention is described. The hard disk drive of the present invention comprises the element-mounted suspension explained above.

According to the present invention, the use of the element-mounted suspension allows a highly functionalized hard disk drive.

Figure 12:
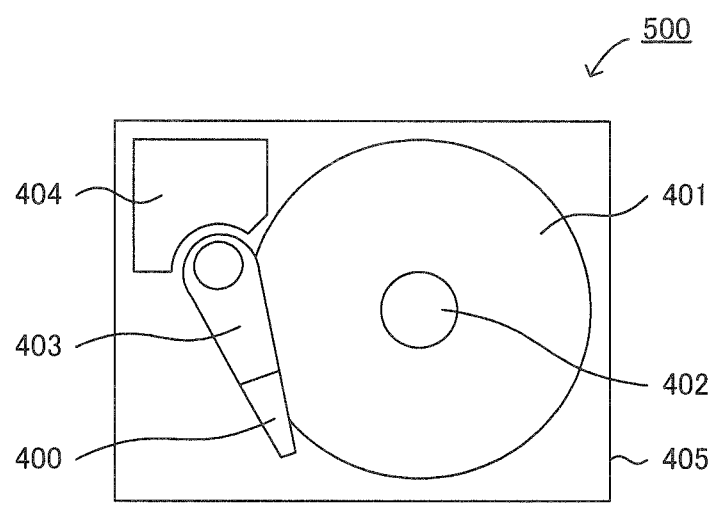
FIG. 12 is a schematic plan view showing an example of a hard disk drive of the present invention.

FIG. 12 is a schematic plan view showing an example of the hard disk drive of the present invention. A hard disk drive 500 shown in FIG. 12 comprises the element-mounted suspension 400, a disk 401 in which the element-mounted suspension 400 performs writing and reading of data, a spindle motor 402 for rotating the disk 401, an arm 403 and a voice coil motor 404 for moving the element of the element-mounted suspension 400, and a case 405 for sealing the members.

The hard disk drive of the present invention comprises at least the element-mounted suspension, and ordinarily has the disk, the spindle motor, the arm and the voice coil motor additionally. The element-mounted suspension is the same as the contents described in the "C. Element-mounted suspension"; therefore, the description herein is omitted. Also, the same members as are used for a general hard disk drive may be used for other members.

E. Manufacturing Method of Suspension Substrate

Next, a manufacturing method of a suspension substrate of the present invention is described. The manufacturing method of the suspension substrate of the present invention is a manufacturing method of a suspension substrate which comprises a metal supporting substrate, a first insulating layer formed on the metal supporting substrate, a first wiring layer formed on the first insulating layer, a second insulating layer formed on the first wiring layer, and a second wiring layer formed on the second insulating layer, comprising steps of: a first wiring layer forming step of forming the first wiring layer having a functional element wiring layer connected to a functional element, and a second wiring layer forming step of forming the second wiring layer having a signal transmission wiring layer comprising a pair of wiring layers and connected to a recording and reproducing element.

Figure 13A:
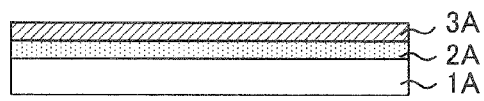
FIGS. 13A to 13G are a schematic cross-sectional view showing an example of a manufacturing method of a suspension substrate of the present invention.
Figure 13B:
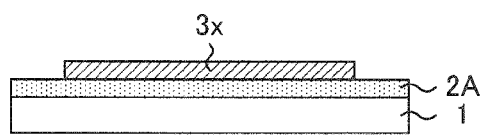

FIGS. 13A to 13G are each a schematic cross-sectional view showing an example of the manufacturing method of the suspension substrate of the present invention. FIGS. 13A to 13G correspond to an A-A cross-sectional view of FIG. 5A similarly to FIG. 5B. In FIGS. 13A to 13G, first, a laminate member having a metal supporting member 1A, an insulating member 2A formed on the metal supporting member 1A, and a conductive member 3A formed on the insulating member 2A is prepared (FIG. 13A). Next, a predetermined resist pattern is formed on a surface of the conductive member 3A and the metal supporting member 1A by using dry film resist (DFR) to form a first wiring layer 3x having a functional element wiring layer and a metal supporting substrate 1 by wet-etching the conductive member 3A and the metal supporting member 1A exposed from the resist pattern (FIG. 13B). On this occasion, an aperture and a jig hole are preferably formed by wet-etching the metal supporting member 1A.

Figure 13C:
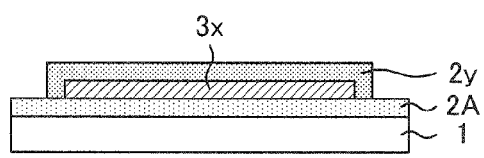
Figure 13D:
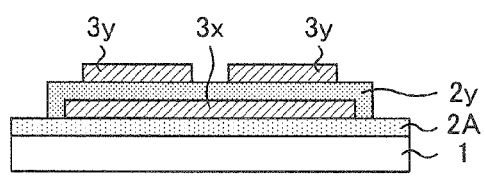
Figure 13E:
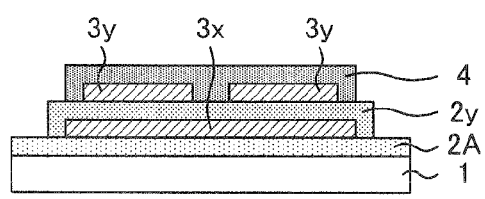

Thereafter, a second insulating layer 2y is formed so as to cover the first wiring layer 3x (FIG. 13C). Next, a seed layer is formed on a surface of the second insulating layer 2y by full-face sputtering to form a predetermined resist pattern on a surface of the seed layer. Next, a second wiring layer 3y having a signal transmission wiring layer is formed in a portion exposed from the resist pattern by an electroplating method (FIG. 13D). Next, a cover layer 4 is formed so as to cover the second wiring layer 3y (FIG. 13E).

Figure 13F:
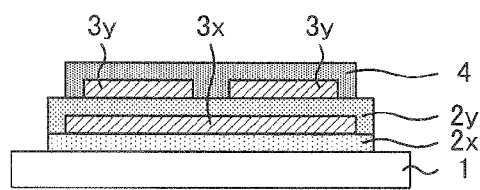
Figure 13G:
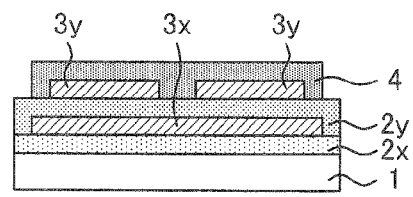

Thereafter, a predetermined resist pattern is formed for the insulating member 2A to form a first insulating layer 2x by wet-etching the insulating member 2A exposed from the resist pattern (FIG. 13F). Next, a wiring plating portion is formed in a terminal portion of the first wiring layer 3x and the second wiring layer 3y by an electroplating method to obtain the suspension substrate by finally performing outline machining of the metal supporting substrate 1 (FIG. 13G).

The present invention allows the suspension substrate such that design freedom of a wiring layer is improved while restraining the upsizing in accordance with an increase in a wiring layer by reason of comprising the first wiring layer forming step of forming the first wiring layer having the functional element wiring layer, and the second wiring layer forming step of forming the second wiring layer having the signal transmission wiring layer.

The manufacturing method of the suspension substrate of the present invention is not particularly limited if the manufacturing method has the first wiring layer forming step and the second wiring layer forming step. These wiring layer forming steps may be a step of the manufacturing method of the suspension substrate by an additive method, or a step of the manufacturing method of the suspension substrate by a subtractive method.

An example of the manufacturing method of the suspension substrate by a subtractive method is hereinafter described in each step.

1. Laminate Member Preparing Step

A laminate member preparing step in the present invention is a step of preparing a laminate member having a metal supporting member, an insulating member formed on the metal supporting member, and a conductive member formed on the insulating member. The laminate member in the present invention may adopt a commercially available laminate member, or be formed by forming the insulating member and the conductive member on the metal supporting member.

2. First Wiring Layer Forming Step

The first wiring layer forming step in the present invention is a step of forming the first wiring layer having a functional element wiring layer connected to a functional element by etching the conductive member.

Examples of a forming method of the first wiring layer include a method of forming a resist pattern on the conductive member of the laminate member to wet-etch the conductive member exposed from the resist pattern. Kinds of an etching solution used for wet etching are preferably selected properly in accordance with kinds of the conductive member; for example, in the case where a material for the conductive member is copper, an iron chloride-based etching solution may be used.

3. Metal Supporting Substrate Forming Step

A metal supporting substrate forming step in the present invention is a step of forming the metal supporting substrate by etching the metal supporting member.

Examples of a forming method of the metal supporting substrate include a method of forming a resist pattern on the metal supporting member of the laminate member to wet-etch the metal supporting member exposed from the resist pattern. Kinds of an etching solution used for wet etching are preferably selected properly in accordance with kinds of the metal supporting member; for example, in the case where a material for the metal supporting member is SUS, an iron chloride-based etching solution may be used. Also, this step is preferably performed simultaneously with the first wiring layer forming step.

4. Second Insulating Layer Forming Step

A second insulating layer forming step in the present invention is a step of forming the second insulating layer on the first wiring layer. A forming method of the second insulating layer is not particularly limited but is preferably selected properly in accordance with a material for the second insulating layer. For example, in the case where a material for the second insulating layer is a photosensitive material, the patterned second insulating layer may be obtained by performing exposure development for the second insulating layer formed on the whole surface. Also, in the case where a material for the second insulating layer is a non-photosensitive material, the patterned second insulating layer may be obtained in such a manner that a predetermined resist pattern is formed on a surface of the second insulating layer formed on the whole surface to remove a portion exposed from the resist pattern by wet-etching.

5. Second Wiring Layer Forming Step

The second wiring layer forming step in the present invention is a step of forming on the second insulating layer the second wiring layer having a signal transmission wiring layer comprising a pair of wiring layers and connected to a recording and reproducing element.

Examples of a forming method of the second wiring layer include a method of first forming a seed layer on the second insulating layer, next forming a predetermined resist pattern on a surface of the seed layer, and finally forming the second wiring layer in a portion exposed from the resist pattern by an electroplating method. Examples of a forming method of the seed layer include a sputtering method and an electroless plating method. Also, examples of a material for the seed layer include metals such as Ni, Cr and Cu. Also, the seed layer may be a monolayer, a multilayer, or a composite layer of monolayers. Also, the seed layer electrically connected to the first wiring layer is obtained by forming a predetermined aperture in the second insulating layer during the second insulating layer forming step described above. As a result, the second wiring layer may be formed by electric power supply from the first wiring layer in the second wiring layer forming step.

6. Cover Layer Forming Step

A cover layer forming step in the present invention is a step of forming the cover layer so as to cover the second wiring layer. Examples of a forming method of the cover layer include the same method as the forming method of the second insulating layer.

7. Wiring Plating Portion Forming Step

A wiring plating portion forming step in the present invention is a step of forming the wiring plating portion in a terminal portion of the first wiring layer and the second wiring layer. Specific examples of a forming method of the wiring plating portion include an electroplating method. Also, in the case of electrically connecting the first wiring layer and/or the second wiring layer to the metal supporting substrate, interlayer connection may be secured by forming a veer plating portion after forming the wiring plating portion.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is hereinafter described more specifically while using examples.

Example

First, a laminate member having SUS304 with a thickness of 18 μm (a metal supporting member), a polyimide resin layer with a thickness of 10 μm (an insulating member), and an electrolyte copper layer with a thickness of 9 μm (a conductive member) was prepared (FIG. 13A). Next, dry film resist was laminated on both faces of the laminate member to form a resist pattern. Next, etching was performed by using a ferric chloride solution to perform resist peeling after etching. Thus, a first wiring layer was formed out of the conductive member and a metal supporting substrate was formed out of the metal supporting member (FIG. 13B).

Thereafter, a polyimide precursor solution was coated on the patterned first wiring layer by a die coater, and subjected to resist plate-making after being dried to etch the polyimide precursor film simultaneously with development, which film was thereafter cured (imidized) by heating under a nitrogen atmosphere to form a second insulating layer (FIG. 13C). Next, a seed layer made of Cr was formed on a surface of the second insulating layer by a sputtering method. Next, a predetermined resist pattern was formed on the seed layer to form a second wiring layer in a portion exposed from the resist pattern (FIG. 13D).

Thereafter, a polyimide precursor solution was coated on the patterned second wiring layer by a die coater, and subjected to resist plate-making after being dried to etch the polyimide precursor film simultaneously with development, which film was thereafter cured (imidized) by heating under a nitrogen atmosphere to form a cover layer (FIG. 13E). Next, the insulating member was subjected to resist plate-making for patterning to remove the polyimide resin in an exposed part by wet-etching (FIG. 13F).

Thereafter, a wiring plating portion (an Au plating portion) was formed in a terminal portion of the first wiring layer and the second wiring layer by an electroplating method. A suspension substrate was obtained by finally removing the unnecessary metal supporting substrate by wet-etching (FIG. 13G).

REFERENCE SIGNS LIST

1 . . . metal supporting substrate, $2x$ . . . first insulating layer, $2y$ . . . second insulating layer, $3x$ . . . first wiring layer, $3y$ . . . second wiring layer, $3a$, $3b$ . . . wiring layer for writing, $3c$, $3d$ . . . wiring layer for reading, $3e$, $3f$ . . . functional element wiring layer (thermal assist wiring layer, actuator element wiring layer), 4 . . . cover layer, 5 . . . wiring plating portion, 12 . . . conductive connecting portion, 100 . . . suspension substrate, 101 . . . recording and reproducing element mounting region, 102 . . . external circuit board connecting region, 103 . . . wiring layer, 210 . . . thermal assist element, 220 . . . recording and reproducing element, 230 . . . adhesive layer, 301 . . . aperture, 310 . . . load beam

The invention claimed is:

1. A suspension substrate comprising a metal supporting substrate, a first insulating layer formed on the metal supporting substrate, a first wiring layer formed on the first insulating layer, a second insulating layer formed on the first wiring layer, and a second wiring layer formed on the second insulating layer;

wherein the first wiring layer has a functional element wiring layer connected to a functional element; and the second wiring layer has a signal transmission wiring layer comprising a pair of wiring layers and connected to a recording and reproducing element.

2. The suspension substrate according to claim 1, wherein the functional element wiring layer has an overlap part which overlaps with the signal transmission wiring layer in a plan view.

3. The suspension substrate according to claim 1 wherein the functional element is a thermal assist element or an actuator element.

4. The suspension substrate according to claim 1, wherein a terminal portion of the functional element wiring layer is a terminal portion connected to the functional element on a surface on the first insulating layer side.

5. A suspension comprising:
the suspension substrate according to claim 1; and
a load beam provided on a surface on the metal supporting substrate side of the suspension substrate.

6. An element-mounted suspension comprising the suspension according to claim 5, and the recording and reproducing element and the functional element mounted on the suspension.

7. A hard disk drive comprising the element-mounted suspension according to claim 6.

8. A manufacturing method of a suspension substrate which comprises a metal supporting substrate, a first insulating layer formed on the metal supporting substrate, a first wiring layer formed on the first insulating layer, a second insulating layer formed on the first wiring layer, and a second wiring layer formed on the second insulating layer, comprising steps of:
- a first wiring layer forming step of forming the first wiring layer having a functional element wiring layer connected to a functional element; and
- a second wiring layer forming step of forming the second wiring layer having a signal transmission wiring layer comprising a pair of wiring layers and connected to a recording and reproducing element.

* * * * *